(12) United States Patent
Kinoshita et al.

(10) Patent No.: US 6,633,429 B2
(45) Date of Patent: Oct. 14, 2003

(54) OPTICAL AMPLIFICATION METHOD AND DEVICE USABLE WITH BANDS OTHER THAN THE C-BAND

(75) Inventors: Susumu Kinoshita, Plano, TX (US); Shinya Inagaki, Shinjyuku (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 09/790,507

(22) Filed: Feb. 23, 2001

(65) Prior Publication Data

US 2002/0001124 A1 Jan. 3, 2002

(30) Foreign Application Priority Data

Feb. 23, 2000 (JP) ........................................ 2000-046467

(51) Int. Cl.$^7$ ................................................. H01S 3/00
(52) U.S. Cl. ............................. 359/337.1; 359/337.21; 359/349
(58) Field of Search ...................... 359/337.1, 337.21, 359/349

(56) References Cited

U.S. PATENT DOCUMENTS

| | | | |
|---|---|---|---|
| 5,260,823 A | | 11/1993 | Payne et al. |
| 5,271,024 A | * | 12/1993 | Huber ........................... 372/6 |
| 5,912,750 A | * | 6/1999 | Takeda et al. ............... 359/124 |
| 6,049,417 A | | 4/2000 | Srivastava et al. |
| 6,307,668 B1 | * | 10/2001 | Bastien et al. ............ 359/337.1 |
| 6,359,726 B1 | * | 3/2002 | Onaka et al. ............. 359/337.1 |
| 6,392,788 B1 | * | 5/2002 | Yoon et al. ................. 359/341 |
| 6,407,855 B1 | * | 6/2002 | MacCormack et al. ..... 359/346 |

OTHER PUBLICATIONS

"Optical Fiber Communication Conference and Exhibit (Dallas, Texas, Feb. 16–21, 1997)," OFC '97 Technical Digest Series, vol. 6, pp. 84 and 85.
Janet L. Jackel et al., "All–optical Stabilization of Multi–Wavelength EDFA Chains: a Network–Level Approach," LEOS, Boston, MA, Nov. 1996.
Y. Sun et al., "Average Inversion Level, Modeling, and Physics of Erbium–Doped Fiber Amplifiers," IEEE Journal of Selected Topics in Quantum Electronics, vol. 3, No. 4, Aug. 1997, pp. 991–1007.

* cited by examiner

Primary Examiner—Mark Hellner
(74) Attorney, Agent, or Firm—Staas & Halsey LLP

(57) ABSTRACT

An optical amplifier includes an optical amplification medium, an excitation source to stimulate the amplification medium to output at least one wavelength gain peak, and a gain equalizer to equalize the output of the amplification medium such that gain is produced at wavelengths other than the wavelength gain peak. The gain equalizer may attenuate gain at the peak wavelength. The gain equalizer may equalize the output of the amplification medium such that gain is produced at wavelengths less than the wavelength gain peak. The optical amplifier may include both a gain equalizer and automatic level control circuitry to respectively maintain substantially uniform gain at wavelengths within an optical signal band and maintain constant output power.

36 Claims, 12 Drawing Sheets

EDFA: ERBIUM-DOPED FIBER AMPLIFIER (1530 - 1570 nm)
GS-EDFA: GAIN-SHIFTED EDFA (1570 - 1610 nm)
EDTFA: TELLURITE-BASED EDFA (1530 - 1610 nm)
TDFA: THULIUM-DOPED FLUORIDE-BASED FIBER AMPLFIER (1450 - 1490 nm)
RFA: RAMAN FIBER AMPLIFIER (1450 - 1650 nm OR MORE)

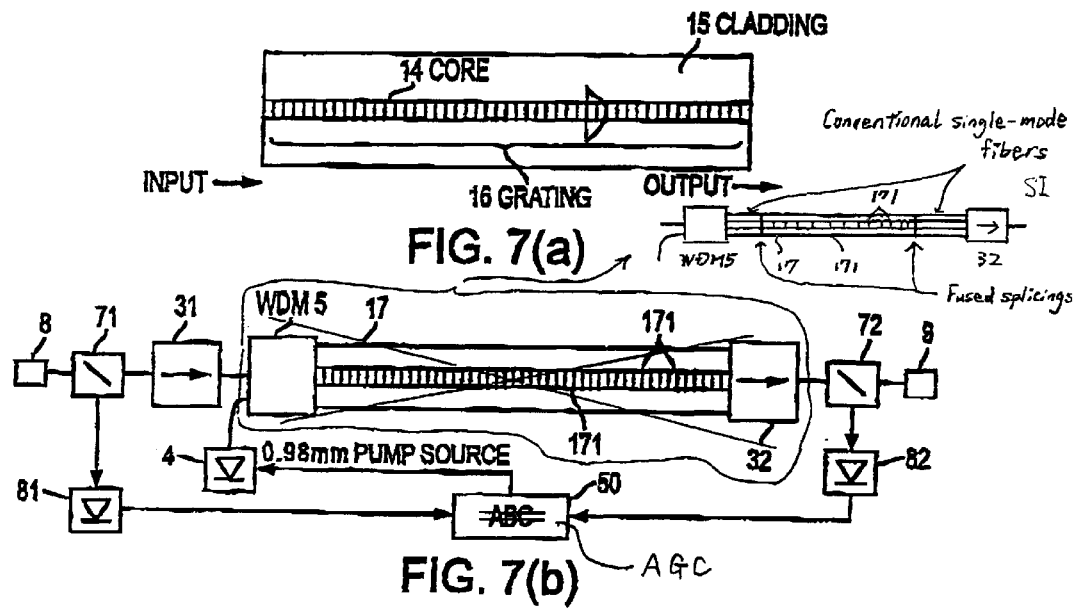
FIG. 7(a)
FIG. 7(b)
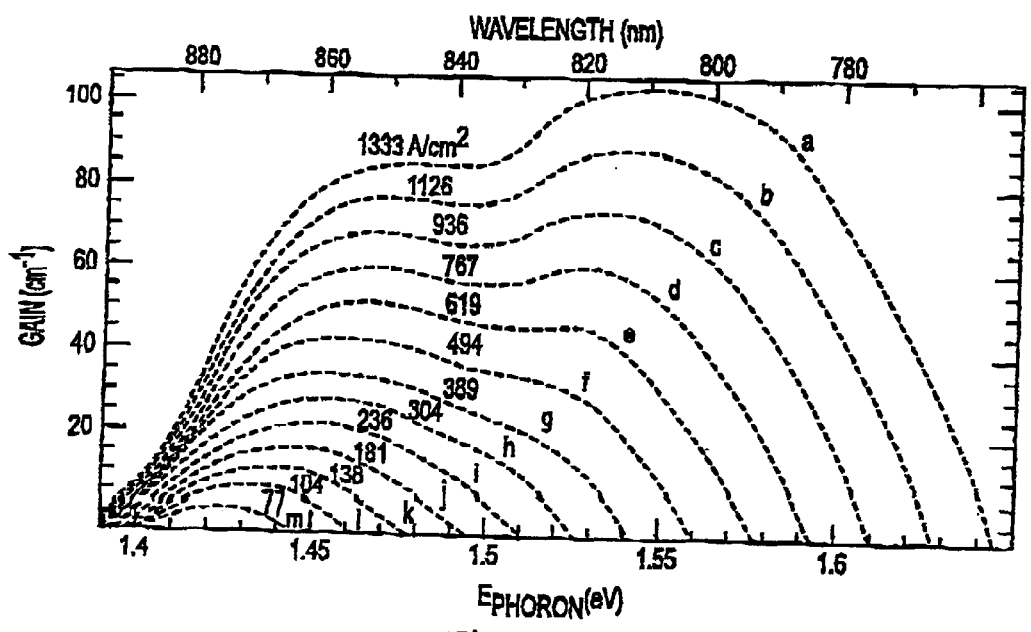
FIG. 8

OPTICAL AMPLIFICATION METHOD AND DEVICE USABLE WITH BANDS OTHER THAN THE C-BAND

CROSS REFERENCE TO RELATED APPLICATIONS

This application is based on and hereby claims priority to Japanese Application No. 046467 filed on Feb. 23, 2000 in Japan, the contents of which are hereby incorporated by reference.

BACKGROUND OF THE INVENTION

Wavelength division multiplexed (WDM) amplifiers amplify optical signals that are composites of multiple wavelength optical signals. WDM optical communications systems relay multi-wavelength composite optical signals through multiple optical amplifiers.

The band over which losses are low in optical fiber transmission circuits (less than approximately 0.3 dB/km) is the band from 1450 nm to 1650 nm. As shown in FIG. 1, a variety of optical fiber amplification devices have been developed for this transmission band.

At present, with the popularity of cellular telephones and the rapid increase in internet use, the demand for telecommunications capacity is expanding explosively. There are global intense research and development efforts for technologies that can increase the information transmission capacity on a single fiber.

Optical wavelength division multiplexing (WDM) technology that uses the broadband characteristics of optical fiber amplifiers having silica erbium-doped fibers (EDF) is critical. The conventional wavelength band is known as both "the 1550 mn band" (1530 to 1560 nm) or "the C band" (conventional-wavelength band).

In addition, EDF optical amplifier equipment for a 1580 nm band (1570 to 1600 nm) "the L band" (longer-wavelength band) has been developed. The competition has become intense in developing a commercial optical fiber telecommunications system that is able to transmit an ultra large capacity (perhaps 1.6 terabit/s) of information by modulating each multiplexed wavelength at 10 Gb/s with about 80 waves in each of the bands for a total composite of 160 waves.

Because there is a capacity of approximately eight THz when C band and L band are combined, when 10 Gb/s transmission signal channels are established with the 2.5 GHz spacing, the overall transmission capacity of 1.6 terabit can be expanded further up to 3.2 Tb/s $$\left( \frac{10 \ Gb/s \times 8{,}000 \ GHz}{25 \ GHz} \right)$$

On the other hand, there is demand for even greater carrying capacity, and so optical fiber amplification devices that have new optical amplification bands, in addition to the current C band and L band, are required.

In FIG. 1, even though GS-TDFA (gain-shifted thulium-doped fluoride-based fiber amplifiers) are being developed for amplification in the S band region from 1490 nm to 1530 nm, GS-TDFA devices have a gain in the region between 1475 and 1510 nm, and thus it may be difficult for them to succeed in the portion of S band extending from 1510 to 1530 nm.

In addition, the 1610 to 1650 nm band is limited to specialty fibers that are either thulium or terbium-doped fluoride-based fibers.

In the optical amplifier devices described above, the optical amplification medium amplifies light through excited emission, which occurs from population inversion of energy levels. There is also Raman fiber amplification, which uses the non-linear effects of fibers. Because Raman fiber amplification makes use of the non-linear effects of fibers, it can produce a gain in any given wavelength band by selecting the wavelength of the stimulating light source. However, there are problems in that the gain per unit length is small, so the optical amplification fibers must placed every several kilometers to every several dozen kilometers within the transmission line.

SUMMARY OF THE INVENTION

An optical amplifier according to one aspect of the invention includes an optical amplification medium, an excitation source to stimulate the amplification medium to output at least one wavelength gain peak, and a gain equalizer to equalize the output of the amplification medium such that gain is produced at wavelengths other than the wavelength gain peak. The gain equalizer may attenuate gain at the peak wavelength. The gain equalizer may equalize the output of the amplification medium such that gain is produced at wavelengths less than the wavelength gain peak.

A variable attenuator and automatic level circuitry may be provided such that the automatic level control circuitry monitors at least one of the input of the optical amplifier and the output of the optical amplifier and maintains the output level of the optical amplifier at a substantially constant level.

The optical amplification medium may be formed from a plurality of amplification medium structures which together produce at least one wavelength gain peak when stimulated by the excitation source. The amplification medium structures may be semiconductor optical amplifiers. Also, the gain equalizer may be formed of a plurality of gain equalizer segments, which together produce gain at wavelengths other than the wavelength gain peak. The gain equalizer segments may be substantially transparent to the pumping wavelength of the excitation source and may be positioned with amplification medium structures positioned therebetween.

The excitation light source may stimulate the optical amplification medium to achieve a population inversion rate having a positive gain throughout an optical signal wavelength band. The wavelength gain peak may be outside of the optical signal wavelength band. The gain equalizer may attenuate the wavelength gain peak.

The optical amplification medium has an input and an output. A feedback hoop to the excitation source may monitor the input and output of the amplification medium and maintain a substantially constant gain within the amplification medium over time. Specifically, an automatic gain control circuit may be connected to monitors at the input and output to control the excitation source so as to maintain a constant gain within the amplification medium over time.

The optical amplification medium may be located within a resonator. The optical amplification medium has an input and an output, and the resonator may include a pair of mirrors that reflect a selected wavelength and optical couplers provided at the input and the output of the amplification medium to divert a portion of the light emitted from the optical amplification medium to the mirrors. The optical couplers may be 9:1 couplers. The mirrors may be fiber grating mirrors. The gain equalizer may be substantially transparent to the selected wavelength. The selected wavelength reflected by the mirrors may be within a signal band used for optical signals, as long as no optical signal to be amplified is transmitted at the selected wavelength.

The optical amplification medium may have a cladding, a doped core provided interior to the cladding, and gratings provided within the highly doped core.

Another aspect of the invention may have an amplification medium formed of at least one erbium doped fiber, an excitation light source to produce a population inversion ratio of about 0.7 to about 1.0 within the amplification medium, and a gain equalizer to obtain substantially identical wavelength characteristics for a wavelength band of from about 1490 nm to about 1530 nm. The excitation light source may supply pumping light to the amplification medium at a pumping wavelength, such that the gain equalizer is substantially transparent to the pumping wavelength. For a wavelength band of from about 1450 nm to about 1490 nm, a population inversion ratio of about 0.8 to about 1.0 may be used. For a wavelength band of from about 1610 nm to about 1650 nm, a population inversion ratio of about 0.3 to about 1.0 may be used.

According to an optical amplification method, a population inversion ratio is selected to achieve positive gain throughout an optical signal wavelength band. The amplification medium is excited to the selected population inversion ratio to produce a wavelength gain peak at a wavelength outside of the optical signal wavelength band. Gain is equalized to achieve substantially uniform gain over the optical signal wavelength band. Amplification in wavelength bands outside of the optical signal wavelength band is attenuated. The optical signal wavelength band may be at wavelengths less than the wavelength of the wavelength gain peak for the amplification medium.

According to yet another aspect of the invention, a WDM splitter separates first and second different optical signal wavelength bands (for example, the C-band and the L-band). An optical amplification device for the first wavelength optical signal band includes a first amplification medium, an excitation light source to produce a first population inversion ratio within the first amplification medium, and a gain equalizer to obtain substantially uniform gain over the first optical signal wavelength band. An optical amplification device for the second wavelength band includes a second amplification medium and an excitation light source to produce a second population inversion ratio within the second amplification medium. The first and second population inversion ratios are different. A WDM coupler recombines the first and second optical wavelength bands after amplification.

The first population inversion ratio may be larger than the second population inversion ratio, for example, assuming that the first optical wavelength band is the C-band and the second is the L-band. The first and second optical amplification mediums may each be formed of a rare earth element doped optical fiber. In this case, the length of the rare earth element doped optical fiber for the first amplification medium may be greater than that for the second amplification medium.

The first amplification medium may have a wavelength gain peak, outside of the first optical signal wavelength band. The WDM splitter may separate first, second and third different optical signal wavelength bands. In this case, the optical amplifier includes an optical amplification device for the third wavelength band.

BRIEF DESCRIPTION OF THE DRAWINGS

The invention will be readily understood by reference to the following description of preferred embodiments described by way of example only, with reference to the accompanying drawings in which like reference characters represent like elements, wherein:

FIG. 7(a) shows a highly doped optical amplification medium;

FIG. 7(b) schematically shows an optical amplifier employing a grated fiber amplification medium;

FIG. 8 shows the variation of wavelength gain characteristics with changes in excitation current for the semiconductor optical amplifier of FIG. 7;

DETAILED DESCRIPTION OF THE PREFERRED EMBODIMENTS

Figure 2:
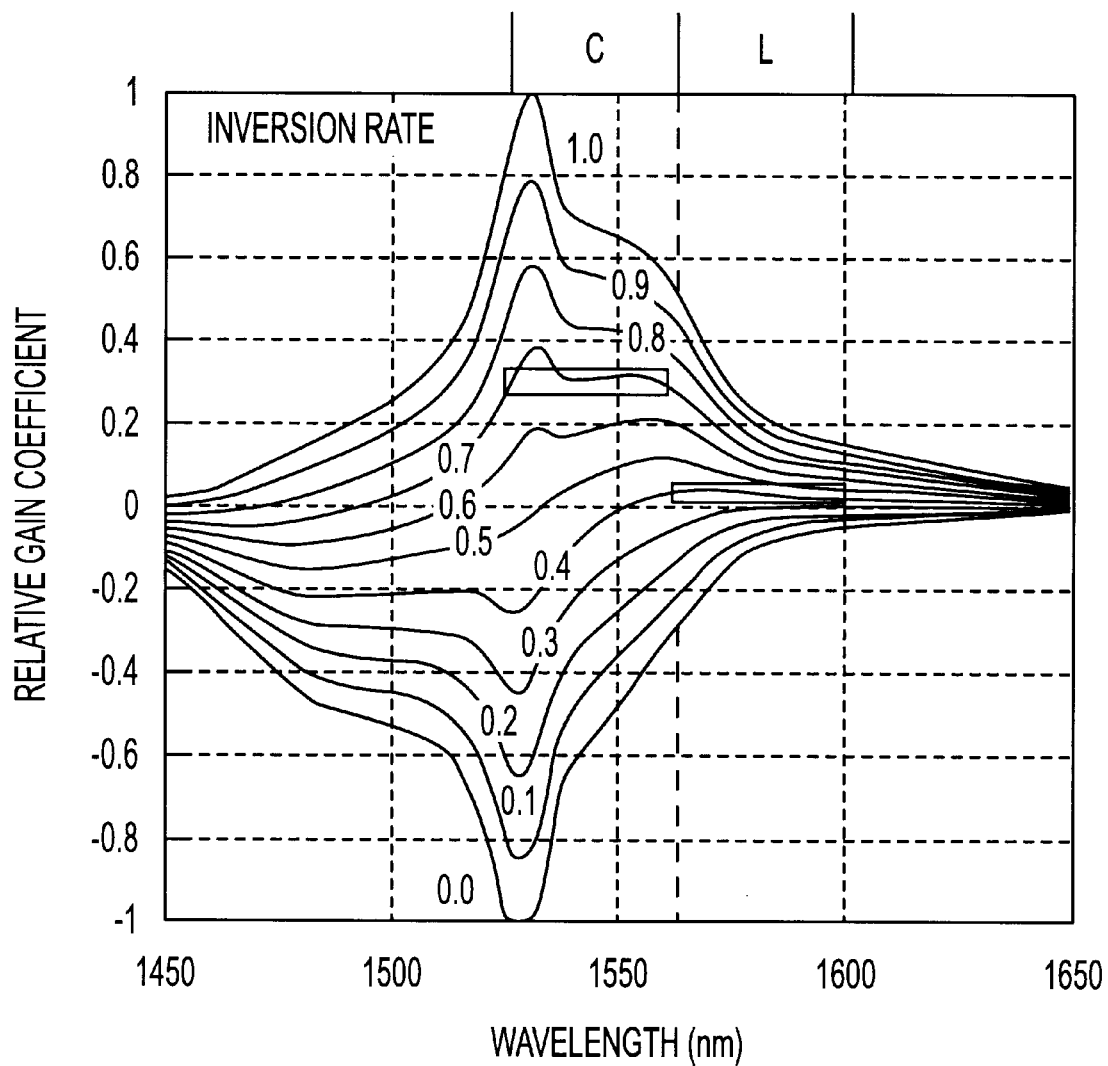
FIG. 2 shows the wavelength gain characteristics in terms of relative gain coefficients, for silica erbium-doped fiber (EDF) amplifiers.

FIG. 2 shows the wavelength gain characteristics in terms of relative gain coefficients, or gain coefficient (dB/m), for silica erbium-doped fiber (EDF) amplifiers. The population inversion rates are defined by the proportion of the erbium ions that are excited. The rate is 1.0 when all of the ions are excited (i.e., when all electrons are excited to a higher level), and if none of the ions are excited (i.e., all are in the non-excited level), then the population inversion rate is 0.0. The relative gain coefficient is labeled on the vertical axis as the gain per unit length.

Figure 3:
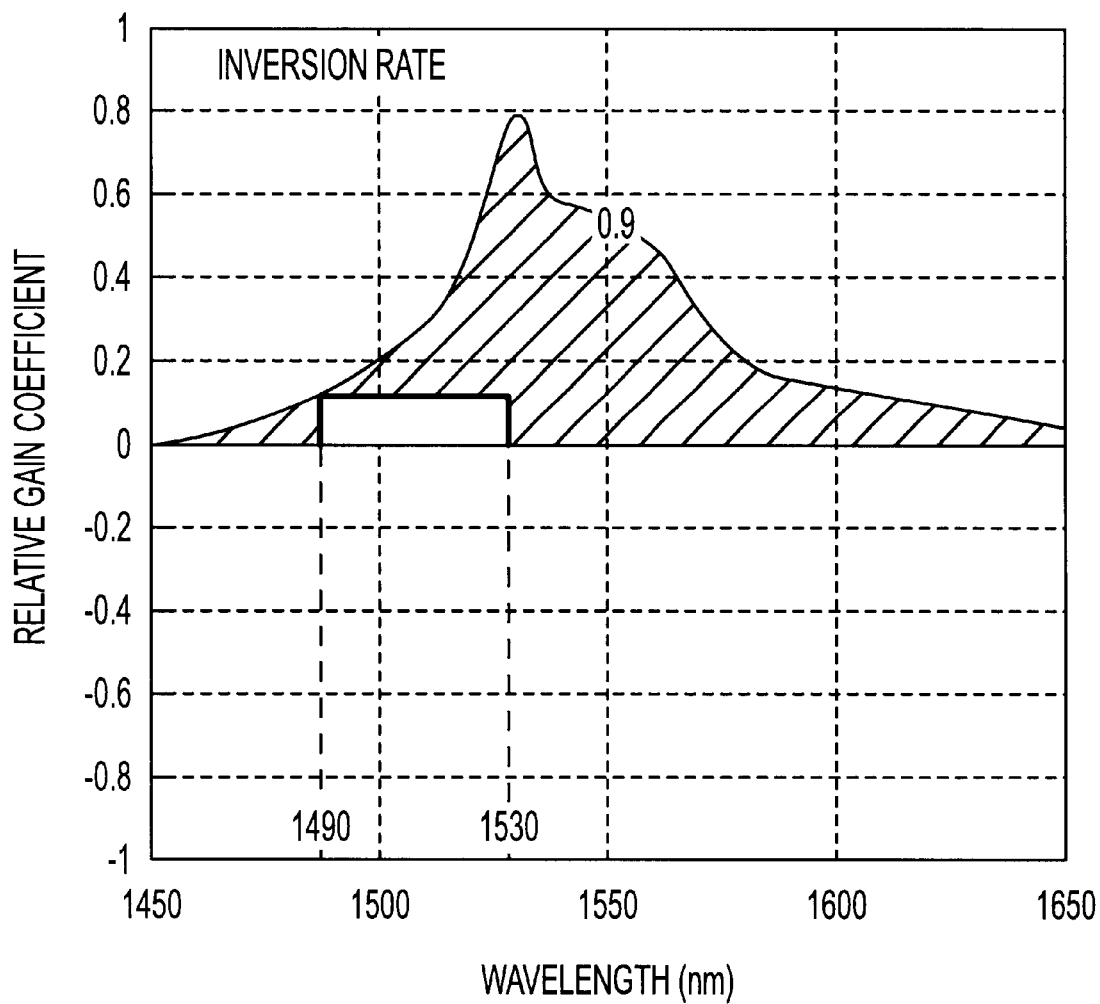
FIG. 3 shows the gain/wavelength characteristics for the 0.9 population inversion ratio shown in FIG. 2, and shows the per-unit length gain characteristics when the S band gain is extracted and equalized.

FIG. 2 corresponds with FIG. 3 of Y. Sun, J. L. Zyskind and A. K. Srivastava, "Average Inversion Level, Modeling, and Physics of Erbium-Doped Fiber Amplifiers," IEEE Journal of Selected Topics in Quantum Electronics, Vol. 3, No. 4, pp. 991–1007, August 1997. The relative gain coefficients shown in FIG. 2 are applicable to any of a plurality of amplification mediums. The FIG. 2 relative gain coefficients can be converted to the Sun et al. gain coefficients (dB/m) if an erbium-doped fiber amplification medium is specified. Also, the population inversion rate of FIG. 2 corresponds with the inversion level in the FIG. 3 of the Sun et al. article. The definition of the population inversion rate or inversion level is the same as that given by Eq. (22) of Sun et al. If the inversion rate is averaged along the length of the EDF, an average inversion rate is obtained, which average inversion rate is defined by Eq. (23) of the Sun et al. article. In fiber amplifiers, the average inversion rate given by Eq. (23) is important. The importance is at least in part due to the fact that the amplifier gain is defined in Eq. (20) of Sun et al. in terms of the averaged rate ($\Delta N(t)$) and the length (L). Therefore, in the discussion of fiber amplifiers, the "population inversion rate" refers to the average population inversion rate.

At present, multi-wavelength optical fiber amplifiers using silica-based erbium-doped fibers (EDF) have population inversion rates up to about 0.7 within the 1550 nm band (1530 to 1570 nm). As can be seen from FIG. 2, the gain is not equal at different wavelengths. Therefore, a gain equalizer is used to produce an even gain that is independent of the wavelength.

As with the C band, multi-wavelength optical amplifiers that amplify the long-wavelength L band (1560 to 1610 nm) are nearing the level for commercialization. In the C band optical amplifier, the gain shape corresponding to a population inversion rate of 0.7, assuming an averaged inversion rate in this discussion, is employed. In the L band optical amplifier, the population inversion rates is intentionally dropped to about 0.4 in silica-based erbium-doped fibers (EDF) to produce maximized gain in the L band. This L band optical amplifier, which uses a silica-based erbium-doped fiber (EDF), requires a longer EDF length, because the gain coefficient (dB/m) is smaller, as shown in FIG. 2.

When one looks closely at the wavelength gain characteristics shown in FIG. 2, when the population inversion ratio is set to, for example 0.9, in the C band, high gains are achieved in bands where they have not been achieved before, such as in the 1450 to 1530 nm band and the 1610 to 1650 nm band (high compared with the gains achieved in the L band using an inversion rate of 0.4). However, because the per-unit length gain for the C band (1530 to 1570 nm) is large when the C band population inversion ratio is 0.9, amplification is dominated by the C band. Because of this, the inventors proposed a gain equalizer (GEQ) to suppress the C band.

FIG. 3 shows the gain/wavelength characteristics for the 0.9 population inversion ratio shown in FIG. 2, and shows the per-unit length gain characteristics when the S band gain is extracted and equalized. When the population inversion ratio is at 0.9, there is a gain peak in the vicinity of 1530 nm. When the area within the gain curve marked by the diagonal lines is eliminated, then there will be gain equalization such that, in the S band, there will be flat gain characteristics as shown by the white cutout rectangular area. The other wavelength bands are eliminated. Using this method, not only is the large per-unit-length gain in the C band eliminated by the equalizer, but also the per-unit-length gain in the S band is reduced because of the equalization. The gain in the S band is flattened for ease in wave length division multiplexing of the transmitted signal light.

Though the per-unit-length gain for the L band optical amplifiers that amplify light using the 0.4 population inversion ratio of FIG. 2 is small, practical L band amplifiers are realized. In other words, when one considers new band amplifiers, we can see that amplification of any band, which has a positive gain coefficient at a selected inversion rate can be realized using the silica-based EDF. Both the gain equalizer and the length of the optical amplification medium are selected based on the gain characteristics at the desired population inversion ratio in order to produce a practical gain in the S band, the S+ band, and the L+ band using silica-based erbium-doped fibers (EDF).

Figure 4:
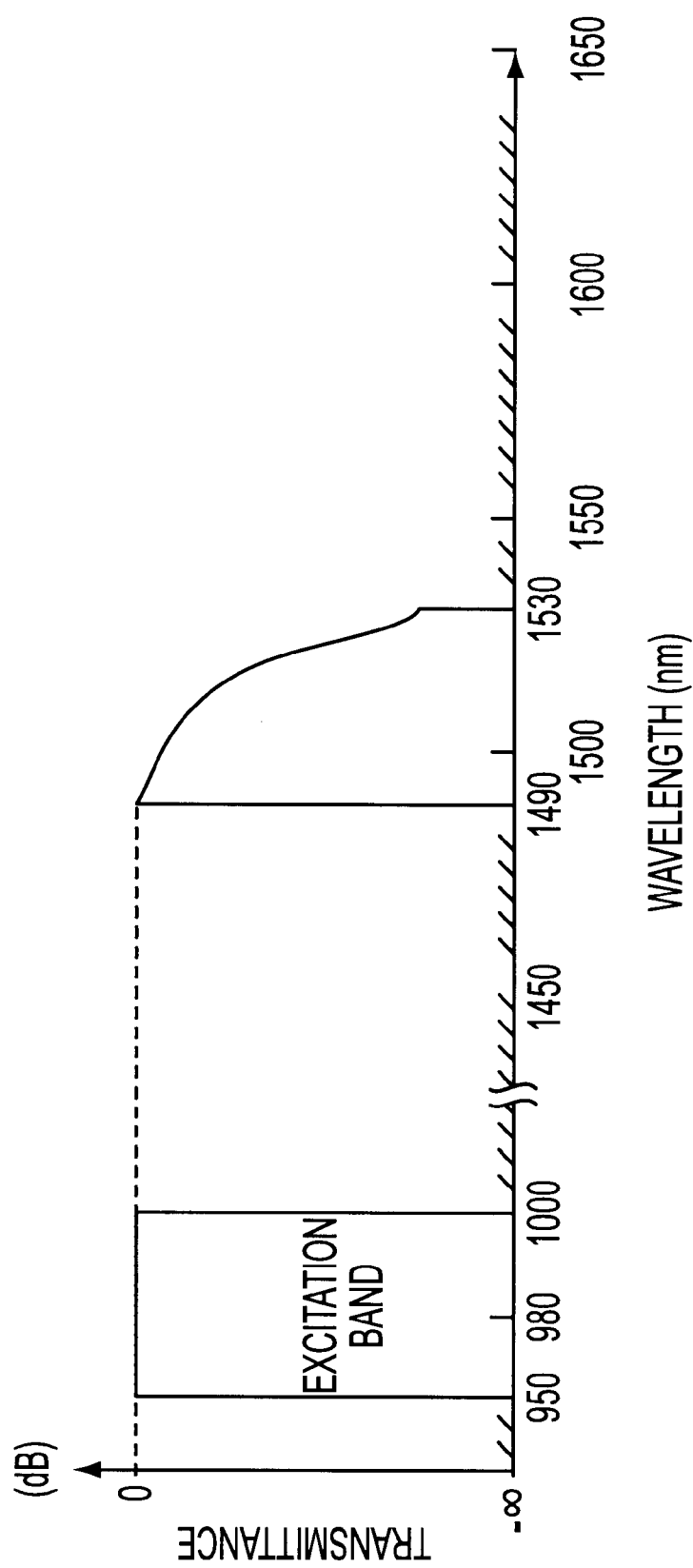
FIG. 4 shows the wavelength characteristics of a gain equalizer in the S band.

FIG. 4 shows the wavelength characteristics of a gain equalizer GEQ, an "optical filter," in the S band. The structure is such that there is a transmittance region in the band between 950 nm and 1000 nm so that 980 nm excitation light can pass through. In the 1490 nm to 1530 nm band, the transmittance falls as the wavelengths grow longer in order to produce the gain characteristics of the white cut out rectangle of FIG. 3. The transmittance in this band varies inversely with the unequalized amplification gain.

Looking at FIG. 4 in terms of FIG. 2, FIG. 4 shows a structure that suppresses the gain peak centered at 1531 nm, which is the characteristic peak. However, if the EDF population inversion is varied, there could be a gain peak in the S band. The gain peak can vary between about 1528 nm and 1535 nm. In addition to the population inversion ratio, the gain peak varies depending on the dopant material (materials such as Al or Ge) and depending on the effective cross-sectional area of the fiber.

Consequently, because the gain peak central wavelength will vary, the characteristics of the gain equalizer must be matched to the central wavelength of the gain for the selected amplification medium and for the population inversion ratio.

Figure 5:
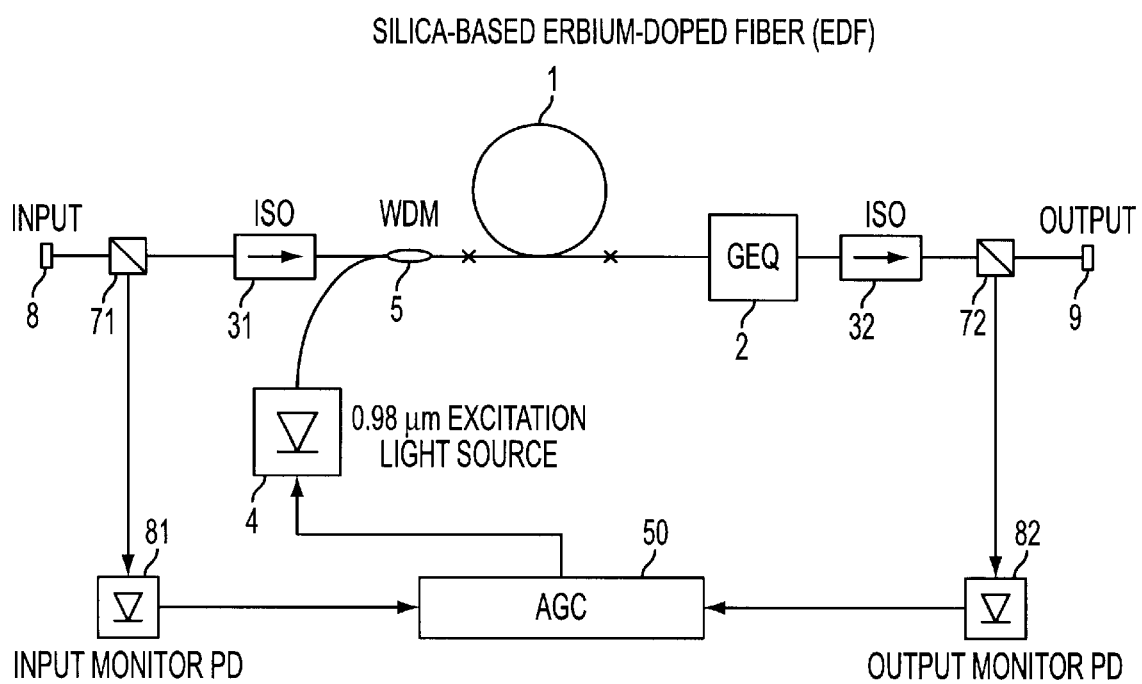
FIG. 5 schematically shows an optical amplifier according to a first preferred embodiment of the present invention.

FIG. 5 schematically shows an optical amplifier according to a first preferred embodiment of the present invention. In FIG. 5, reference numeral 1 represents a silica-based erbium-doped fiber (EDF), reference numeral 2 represents a gain equalizer (GEQ), reference numerals 31 and 32 represent optical isolators, reference numeral 4 represents the excitation light source, reference numeral 5 represents a multi-wavelength coupler, reference numeral 8 represents the input terminal, reference numeral 9 represents the output terminal, reference numerals 71 and 72 represent optical splitter couplers, reference numeral 81 represents an input monitor photodiode PD, reference numeral 82 represents an output monitor photodiode PD, and reference numeral 50 represents an automatic gain control circuit (AGC).

Multi-wavelength light that is input through input terminal 8 to pass through the optical isolator 31 and the multi-wavelength coupler 5. This light is input into the silica-based erbium-doped fiber (EDF) 1, which is the amplification medium that produces excited emission. The silica-based erbium-doped fiber or fibers (EDF) used here has/have a 7 mm mode field diameter, an Er density of 500 ppm and a fiber length of 150 m. This fiber configuration is only one example, and other typical EDFs can be used. Typical EDF mode field diameters of fibers currently on the market range from 5 mm to 8 mm, and typical Er densities range from 100 ppm to 1500 ppm. When it comes to fiber length, the length is adjusted for the amplifier depending on the amplification gain and on the Er density. The length can vary within a broad range, from about 1 m to about 10 km. Furthermore, the fiber length is subject to adjustment depending on the desired gain and the per-unit-length gain for the amplified wavelength band, which depends on the population inversion ratio.

In the silica-based erbium-doped fiber (EDF) 1, the multi-wavelength light that is injected through input terminal 8 is optically amplified using 0.98 μm excitation light from the excitation light source 4. The excitation light is injected through the multi-wavelength coupler 5. After amplification, the injected light is sent to the gain equalizer 2. The excitation light power is controlled by AGC (50) so that the average population inversion ratio in the silica-based erbium-doped fiber 1 is 0.9 and the wavelength characteristics in FIG. 3 are obtained.

The gain equalizer 2 may have the gain equalization characteristics shown in FIG. 4, in which gain equalization produces gain within the white rectangular cutout in FIG. 3. In FIG. 3, transparency of the gain equalizer 2 to excitation (or pump) band light is not required, because the gain equalizer 2 is located at the output port of the silicon-based erbium-doped doped fiber (EDF) 1. That is, the gain equalizer 2 need not be transparent to 980 mn excitation light in this case. The gain equalizer 2 can be made from combinations of multiple Fabry-Perot etalon filters, multilayer dielectric filters, and/or fiber grating filters.

The amplified signal travels to the output (9) through the gain equalizer 2 via the isolator 32 and the optical splitter coupler 72. The optical splitter coupler 71 on the input terminal side splits a portion of the input light to supply the input monitor photodiode PD 81. The optical splitter coupler 72 on the output terminal side splits a portion of the amplified output light and supplies it to the output monitor PD 82.

The automatic gain control circuit (AGC) 50 controls the optical output power of the 0.98 $\mu$m semiconductor laser, which that serves as the excitation light source 4. Control is based on the light detected at the input monitor PD 81 and the output monitor PD 82 so that the gain of the erbium-doped fiber 1, or the averaged population inversion ratio, remains constant. By maintaining the EDF gain at a constant value the population inversion ratio is also maintained at a constant value, regardless of the input power.

When the output level should be controlled to a constant value and more control, namely an automatic level control (ALC) is desired, a variable attenuator can be provided in addition to having the automatic gain control circuit (AGC) 50. The variable attenuator can be positioned at either the input terminal 8 or the output terminal 9, making it possible to control the output of the optical amplifier to a constant value by controlling either the level of the optical signal that is input to the optical amplifier or by controlling the level of the optical signal that is output from the optical amplifier. This control is appropriate when controlling the gain of the optical amplifier to a constant value is not sufficient because of optical signal power fluctuations due to variations such as span-loss variation. Therefore, automatic gain control is used to keep the averaged-population-inversion-level constant, and automatic level control is used to keep the total-output-power constant.

The reason why the gain control of the automatic gain control circuit (AGC) 50 is helpful is because the wavelength characteristics of the gain or the averaged population inversion ratio can be kept at a certain level, as is shown in FIG. 2.

The reason why the 0.98 $\mu$m excitation light source is used in FIG. 5 is because it is able to raise the population inversion ratio up to 1, while 1.48 $\mu$m pump light is theoretically limited to a population inversion rate of approximately 0.7. As long as there is a sufficient averaged inversion level, with good amplification efficiency, a 1.48 $\mu$m band (ranging from 1.45 $\mu$m to 1.49 $\mu$m) pump light can be used instead.

FIG. 5 has been explained with regard to forward-pumping where the pump light is supplied from the input terminal side of the EDF. However, the multi-wavelength coupler 5 can be positioned between the gain equalizer 2 and the optical isolator 32 to excite in the backwards directions, stimulating the EDF from output terminal side. Alternatively, bi-directional excitation, where excitation light excites the EDF from both the input terminal side and the output terminal side, can be used. In the case of bi-directional excitation, a combination of the 0.98 $\mu$m and the 1.48 $\mu$m pump light bands can be used for the pumping sources.

When backward excitation is used, the wavelength characteristics of the gain equalizer must be such that it is possible for the backward direction excitation light to pass through GEQ 2. FIG. 4 shows an example of GEQ characteristics transparent to 0.98 $\mu$m pump light. Specifically, the 1.48 band excitation light or the 0.98 band excitation light, which ever is used for backward pumping, must pass through the gain equalizer 2.

The excitation light source need not necessarily be just a single semiconductor laser, but a composite of wavelengths or polarizations of light from multiple semiconductor lasers can be used.

Although a population inversion ratio of 0.9 was used as an example for S band optical amplifier shown in FIG. 5, the population inversion ratio can be otherwise selected to achieve gain (for a desired) band region, provided that the selected population inversion ratio provides a positive gain coefficient in the desired band. See FIG. 2. As with before, gain equalization can be performed to reduce the gain in bands other than the band region used. The S band optical amplifier can use population inversion ratios ranging from 0.7 to 1 with the optical amplification medium used in FIG. 2.

When structuring an S+ band optical amplifier for the bands between 1450 nm and 1490 nm, a population inversion ratio between 0.8 and 1 can be used from FIG. 2. When structuring an L+ band optical amplifier for the wavelengths between 1610 nm and 1650 nm, a population inversion ratio between 0.3 and 1 can be used.

Because the gains obtained for each band will vary with the length of the EDF (which is the optical amplification medium), the length of the EDF must be selected to match the targeted gain.

The S band optical amplifier described above is very different from the L band optical amplifiers already developed. When the gain wavelength characteristics of the L band optical amplifiers that use population inversion rates of about 0.4 (FIG. 2) are examined, it is apparent that the peak gain is within the L band (even though the value itself is small). This is because the excitation light power automatically is converted into an L band amplifying light if the population inversion ratio is held at 0.4 by the gain control circuit (AGC). Therefore, the L band amplifier has a high amplification efficiency in the band of light being amplified.

On the other hand, when S band amplification is performed using a population inversion ratio of 0.9, it is necessary to suppress with a gain equalizer, the C band light, for example, where the gain is larger than for the S band.

The GEQ 2 of FIG. 5, is provided only on the output side of the fiber 1. In this case the conversion efficiency of the optical amplifier may be less than desired because the majority of the excitation light power is converted into spontaneous emission (ASE) outside of the S band, mainly around the 1.53 $\mu$m gain peak in FIG. 3. In FIG. 5 the gain equalizer eliminates this enormous and unnecessary ASE. The conversion efficiency of the amplifier in FIG. 5 may be only several percent or lower. In general, the conversion efficiency of optical amplifiers in the C band is about 60%, and in the L band, conversion efficiencies of about 40% have been achieved.

Figure 6:
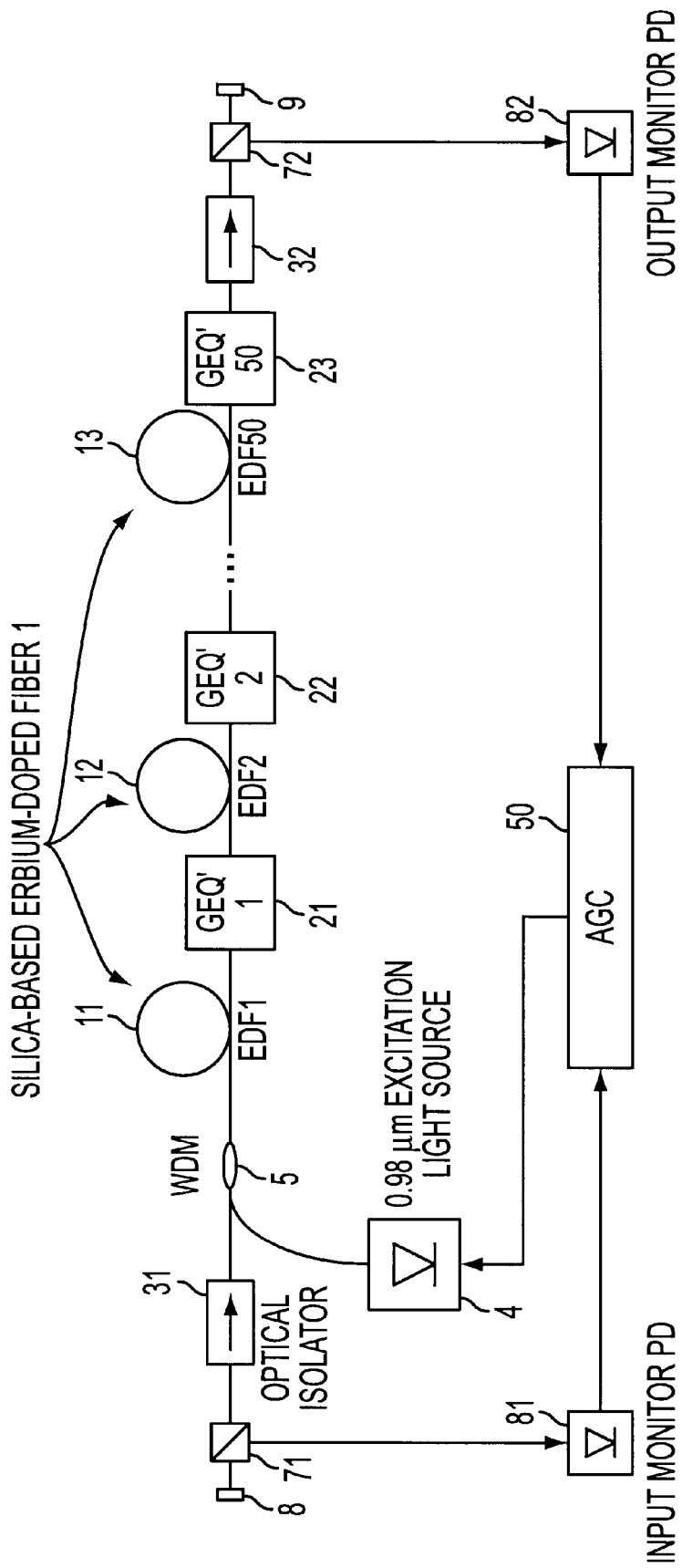
FIG. 6 schematically shows a multiple segment optical amplifier according to a second preferred embodiment of the invention.

FIG. 6 shows an example of an embodiment for improving the conversion efficiency relative to the structure in FIG. 5. FIG. 6 schematically shows a multiple segment optical amplifier according to a second preferred embodiment of the invention. In FIG. 6 the amplification medium is divided into multiple segments. For example, if the sum total length of these segments equals the length of the EDF in FIG. 5, then the FIG. 6 device achieves the same gain as in the amplifier of FIG. 5. In FIG. 6, gain equalization is distributed along the entire amplification medium to improve the conversion efficiency by eliminating ASE before it becomes very large.

In FIG. 6, reference numerals 11, 12, and 13 represent silica-based erbium-doped fibers (EDF), reference numerals 21, 22, and 23 represent gain equalizers (GEQ), reference numerals 31 and 32 represent optical isolators, reference numeral 4 represents an excitation light source, reference numeral 5 represents a multi-wavelength coupler, reference numeral 8 represents the input connector, reference numeral 9 represents the output connector, reference numerals 71 and 72 represent optical splitter couplers, reference numeral 81 represents an input monitor PD, reference numeral 82 represents an output monitor PD, and reference numeral 50 represents an automatic gain control circuit (AGC).

The wavelength multiplexed light is injected from the input port 8 to pass through the optical splitter coupler 71, the optical isolator 31, and the multi-wavelength coupler 5. From there, the input light is injected into the first silica-based erbium-doped fiber (EDF) 11, which serves as the amplification medium. If an EDF length of 50 m is appropriate to obtain the desired gain using a population inversion ratio of 0.9, this EDF length can be segmented into one meter length segments by using fifty silica-based erbium-doped fibers, the first EDF fiber 11 through fiftieth EDF fiber 13 (EDF50). Each EDF segment is connected, respectively, to one of the gain equalizers from the first GEQ'1, 21 through fiftieth GEQ'50, 23. The prime symbol (') after "GEQ" is to differentiate the gain equalizers of the FIG. 5 and FIG. 6 embodiments. A long-period fiber grating gain equalizer is a good candidate for the gain equalizers GEQ' 1, GEQ' 2, ..., and GEQ' 50.

The GEQ' wavelength transmittance characteristics can be reduced to 1/50 of the required transmittance (in terms of dB units) for the signal wavelength band (e.g., 1490 to 1530 nm). This is because fifty GEQ' units are used. Therefore, the small amount of ASE produced in each segment (perhaps 1 meter long) is eliminated at the output of each EDF segment by a gain equalizer GEQ'. In this manner, the unnecessary conversion of pump light power to ASE is dramatically reduced.

In the silica-based erbium-doped fibers EDF, the multi-wavelength light that is injected through the input terminal 8 is amplified by the 0.98 µm excitation light from the excitation light source 4. The excitation light is injected through the multi-wavelength coupler 5. From EDFs, the multi wavelength light is injected into the gain equalizers. Within EDFs, the excitation light in the silica-based erbium-doped fiber 1 performs excitation to obtain the wavelength characteristics at a population inversion ratio of 0.9. Exemplary wavelength characteristics are shown in FIG. 3.

The gain equalizers 21 through 23, as a whole, have the gain equalization characteristics shown in FIG. 4, to impart the characteristics shown by the white rectangular cutout in FIG. 3. The gain equalizers 21 through 23 are substantially transparent with respect to the pumping light. The gain equalizers 21 through 23 should have high return-loss characteristics, namely very low reflectivity (∼−60 dB) to avoid resonance among the gain equalizers 21, 22 and 23. After gain equalization, the amplified light is output through the optical isolator 32, with the amplified light exiting via the output terminal 9.

Each of the gain equalizers 21-23 may have its own unique equalization characteristics or the same equalization characteristics. Regardless of the individual equalization characteristics, the characteristics obtained as the final result should be the same as the characteristics shown in FIG. 4. The gain equalizers 21 through 23 can be created from a combination of Fabry-Perot etalon filters and dielectric multilayer filters, or by fiber grating filters.

The input-side optical splitter coupler 71 splits off a portion of the incident light and injects it into the input monitor photodiode PD 81, while the output-side optical splitter coupler 72 splits off a portion of the light that was amplified by the last EDF 13 and injects it into the output monitor photodiode PD 82.

The automatic gain control circuit (AGC) 50 controls the optical power that is output from the 0.98 µm semiconductor laser that serves as the excitation light source 4. The output power is controlled based on the light that detected by the input monitor PD 81 and the output monitor PD 82 to maintain the gain of the optical amplifier (or, more strictly speaking, the total gain of all EDFs) at a constant value. Gain control is important because variations in the gain cause variations in the wavelength characteristics due to the variations of the averaged population inversion rates.

In addition, when it is desirable that the automatic level control (ALC) be performed so that the output level is constant, while maintaining constant the wavelength characteristics of the gain by AGC (50), a variable attenuator can be added at the input terminal 8 or the output terminal 9. With a variable attenuator, the output of the optical amplifier can be maintained at a constant level through controlling either the level of either the optical signal injected into the optical amplifier or the optical signal output from the optical amplifier. This can occur even if the gain of the optical amplifier is controlled to a constant gain.

In FIG. 6, a 0.98 µm excitation light source is used. However, a 1.48 µm excitation light source may be used instead.

Furthermore, FIG. 6 has been explained with regard to forward direction excitation, to excite the EDF from the input side. However, the multi-wavelength coupler 5 can be equipped between the optical isolator 32 and the gain equalizer 23 to allow backwards excitation from the output terminal side of the EDF. Alternatively, bi-directional excitation can be used, by providing excitation light to the EDF from both the input terminal side and the output terminal side of the EDF. Furthermore, when bi-directional excitation is used, a 0.98 µm excitation light source and/or a 1.48 µm excitation light source can be used. In this case, the excitation light with either wavelength can be used as the forward excitation. The excitation light source need not necessarily be just a single semiconductor laser, but a composite of wavelengths or polarizations of light from multiple semiconductor lasers can be used.

In addition, when it is necessary for the population inversion ratio to be high, such as close to 1, then high power excitation light source is required and multi-wavelength couplers can be equipped between each EDF segment. In this manner, excitation light (forward excitation, backwards excitation, or bidirectional excitation) can then be supplied separately to each EDF segment.

Although a population inversion ratio of 0.9 may be used to produce the S band optical amplifier of FIG. 6, other populations inversion ratios can be selected to produce gain in the desired band. As with the S band and the 0.9 inversion ratio, gain equalization can be performed to reduce the gain in bands other than the desired band.

An S band optical amplifier can be structured using population inversion ratios ranging from 0.7 to 1 with the optical amplification medium used in FIG. 6. An S+ band optical amplifier for the bands between 1450 nm and 1490 nm, can be achieved with a population inversion ratio between 0.8 and 1.0. An L+ band optical amplifier, for the bands between 1610 nm and 1650 nm, can be achieved with a population inversion ratio between 0.3 and 1.0.

In the section below, the device shown in FIG. 5 will be compared with the device shown in FIG. 6 to explain the improvement in the conversion rate of the excitation light power into S band signal light.

In the optical amplifier shown in FIG. 5 the ASE gain curve shown in FIG. 3 is large. Because the portion that is shown with the diagonal lines (most of the gain) is eliminated by the GEQ 2, the excitation light converted into unused ASE represents somewhat of a waste.

On the other hand, even though the pump light source 4 shown in FIG. 6 produces the same ASE gain curve of FIG. 3, each gain equalizer from 21 to 23 eliminates ASE except at 1490 to 1530 nm, namely except within the S-band. Before subsequent amplification stages, unneeded light is removed. This leads to improved efficiency.

If we assume that the total ASE power in FIG. 3 (i.e., the total area under the curve) is 100 mW, and we eliminate the part shown by the diagonal lines (which we assume to be 90%), then about 90 mW is wasted. The wasted 90 mW has been converted from the excitation light. Therefore, at the very least, 90 mW of power of the excitation light is wasted.

Because the white rectangular cutout area is in the signal band, it cannot be eliminated. In FIG. 6, there are 50 EDF segments. Perhaps 1/50 of the ASE gain occurs in each EDF segment –1/50 of the total ASE gain power (area under the FIG. 3 curve). For a total ASE power of 100 mW, this translates to 2 mW. If 90% is wasted, this translates to a wasters of at most 1.8 mW.

The critical point here is that the 1.8 mW ASE that is generated in the first stage erbium-doped fiber 11 (EDF1) causes unwanted excited emission in the next stage if it is not eliminated using the GEQ 21.

Placing a single GEQ on the output side, as shown in FIG. 5, allows the waste ASE to grow along the EDF 1. The well-grown ASE at the end of EDF 1 is eliminated by the GEQ 2. On the other hand, in FIG. 6, the ASE is eliminated after it has only grown slightly. Therefore it is possible to use for signal amplification, the excitation energy that would otherwise be used to amplify the unwanted ASE. This improves the conversion efficiency. Accordingly, segmenting the EDF and inserting low-loss GEQs between the segments increases the conversion efficiency.

The key to improving the conversion efficiency is the selection of the position of the GEQs in the lengthwise direction of the EDF. If the FIG. 5 device were altered to divide the silica-based erbium-doped fiber 1 into two segments with a gain equalizer placed between the two segments, the characteristics shown by the rectangular cutout in FIG. 3 can still be produced as the final output. With this two segment structure, it is possible to improve excitation light conversion in the S band over that where a single gain equalizer is placed on the output side.

FIG. 7(a) shows a highly doped optical amplification medium, for example, a highly-doped EDF. Although FIGS. 5 and 6 use existing silica-based EDFs, other amplifier mediums, such as a shortened highly doped fiber or Er-doped optical wave guide shown in FIG. 7(a), can be used. FIG. 7(a) shows a semiconductor amplification device. In this device, the density of the added erbium per-unit-length is increased. Reference numeral 14 represents the core, reference numeral 15 represents the cladding, and reference numeral 16 represents the grating.

In FIGS. 5 and 6 the EDF has a mode field diameter of 7 mm and erbium is doped at a concentration of 500 ppm. A population inversion ratio of 0.9 may be used, and the total length of the EDF may be about 150 m. These properties obtain the target gain of about 20 dB. Consequently, if the fiber or waveguide substrate base material uses high density Er doping of $15 \times 10^5$ ppm (3,000 times as much doping), then a total length of 5 cm (1/3,000th the length) would be adequate to achieve the same gain. If the length traversed by the light is 5 cm, then the grating 16 can function as a gain equalizers 21, 22 and 23. Because the FIG. 7(a) device may serve as both the amplification medium and the gain equalizers 21–23, it represents an almost infinite segmentation compared with 50 unit segmentation in FIG. 6. The gratings 16 of FIG. 7(a) are formed in the optical wave guide core 14. By structuring the amplification medium as shown in FIG. 7(a), it is possible to achieve optical amplifier with excellent properties, similar to that when the GEQs are distributed such as shown in FIG. 6.

Gratings 16 can be formed in the waveguide core of a semiconductor optical amplifier or gratings can be formed in a single mode fiber amplification medium. Gratings can also be formed in a non-highly doped silica-based erbium doped fiber. In this case, it is important to use technology such as the long-period grating technology so that the eliminated light by the GEQ is not returned to the core, or more precisely not coupled to the fundamental-mode, to cause resonance. Resonance occurs within the Er-doped amplification medium when the removed light by the GEQ is returned into the core. This leads to unstable operation due to resonance or unwanted laser emission. It is necessary to create and install the GEQs to avoid this situation.

FIG. 7(b) is a schematic view of an optical amplifier employing a single mode fiber amplification medium 17 having gratings 171 formed therein. The gratings 171 are formed in the fiber core using long-period grating technology. The amplification medium 17 therefore functions as both a amplifier and as a gain equalizer. Therefore, an effect similar to having multiple gain equalizers GEQ 21, 22 and 23, is achieved. In fact, because there are numerous gratings 171 formed in the fiber 17, it is analogous to having an almost infinite number of fiber segments and an infinite number of gain equalizers in the FIG. 6 device. In the FIG. 8 device, the fiber 17 with gratings 171 could be replaced with the highly doped amplifier shown in FIG. 7(a) and having gratings 16. The schematic appearance of the device would be similar.

FIG. 8 shows the variation of wavelength gain characteristics with changes in excitation current for the semiconductor optical amplifier of FIG. 7(a). So we use the FIG. 7(a) device as an EDF with gratings in one case, and as a semiconductor amplifier with gratings in the other case. When a semiconductor optical amplifier is instead of a fiber and a pump light source, a bias current is used as the excitation source instead of light.

As can be seen in FIG. 8, the semiconductor optical amplifier has different amplification peaks at different population inversion ratios. By changing the population inversion ratio through varying the excitation current, the wavelength position of the amplification peak and the gain curve are changed.

As with the use of pumping light in EDFs, the excitation current is selected to produce a population inversion ratio in which sufficient gain is achieved and maintained constant in the band of interest. By using multiple gain equalizers to equalize the gain produced in unwanted band ranges, it is possible to achieve an excellent pumping light conversion ratio in a band outside of the peak amplification gain wavelength.

Figure 9:
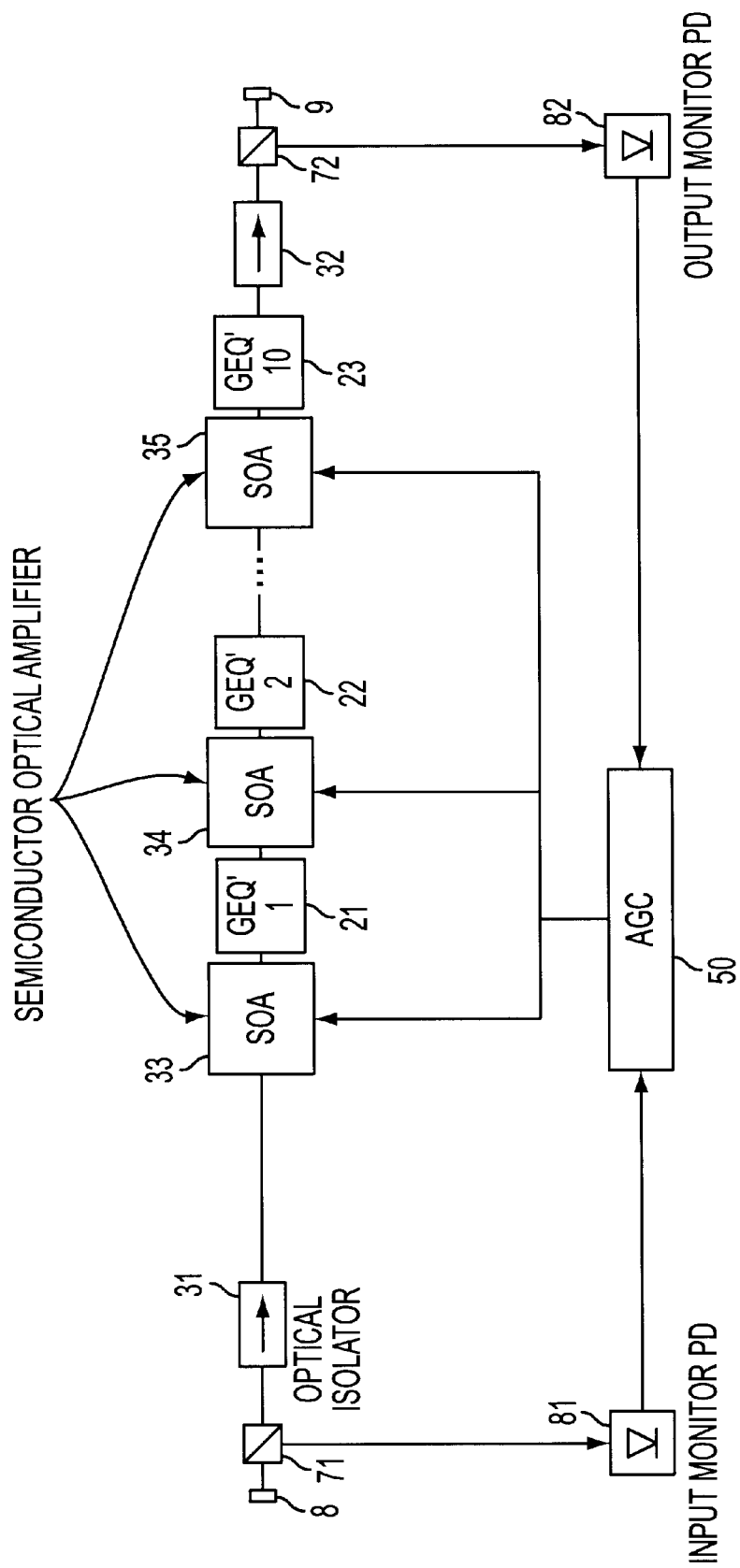
FIG. 9 schematically shows an optical amplifier using a plurality of semiconductor optical amplifier as the amplification medium, according to a third preferred embodiment of the present invention.

FIG. 9 schematically shows an optical amplifier using a plurality of semiconductor optical amplifiers as the amplification medium. Most of the components shown in FIG. 9 are the same as those in FIG. 6. However, multiple semiconductor optical amplifiers ("SOA") 33, 34, and 35 such as that shown in FIG. 7 are used instead of multiple erbium doped fibers. Wavelength division multiplexed signal light is injected from input terminal 8 to pass through the optical splitter coupler 71 and the optical isolator 31. The signal is then injected into the semiconductor optical amplifiers (SOA) 33 through 35, which serves as the amplification media.

In the device shown in FIG. 9, a plurality of semiconductor optical amplifiers (SOA) are connected together in a staged relationship to obtain the specific gain in the target wavelength band. Gain equalizer 21 (GEQ' 1) through gain equalizer 23 (GEQ' 50) are respectively connected between the semiconductor amplifier segments 33 through 35. Because multiple gain equalizers are used, the overall transmittance wavelength characteristics (that are achieved at the output) are derived from the sum of the gain equalizations achieved in the gain equalizers. In each gain equalizer, the amount of gain equalization may equal the total amount of gain equalization divided by the number units (see FIG. 5). Alternatively, each of the gain equalizers may have its own unique equalization characteristics. Regardless of whether they have unique or the same equalization characteristics, the characteristics obtained as the final result should be such that a flat gain region is obtained in the target band.

The gain equalizers 21 through 23 can be created by a combination of Fabry-Perot etalon filters and dielectric multilayer filters, or fiber grating filters.

The input terminal-side optical splitter coupler 71 splits off a portion of the incident light and injects it into the input monitor photodiode PD 81 and the output terminal-side output splitter coupler 72 splits off a portion of the light that has been amplified by the semiconductor amplifiers SOA 33–35 and injects it into the output monitor PD.

The automatic gain control circuit (AGC) 50 controls the bias level of the excitation current for semiconductor optical amplifiers SOA 33 to 35 based on the light that is detected by the input monitor PD and the output monitor PD to maintain constant the overall gain of the optical amplifier.

Variations in wavelength characteristics cause variations in gain. If a variable gain equalizer (GEQ) is used, it can adapt to changes in the SOA gain due to changes in the wavelength characteristics.

In addition, when it is desirable to maintain the output level constant, while maintaining the wavelength characteristics of the gain by AGC (50), a variable attenuator can be added at the input terminal 8 or the output terminal 9. The variable attenuator can be controlled through automatic level control (ALC) circuitry. With a variable attenuator, the output of the optical amplifier can be maintained at a constant level through controlling either the level of either the optical signal injected into the optical amplifier or the optical signal output from the optical amplifier. This may be appropriate even if the gain of the optical amplifier is controlled to a constant gain.

Figure 10:
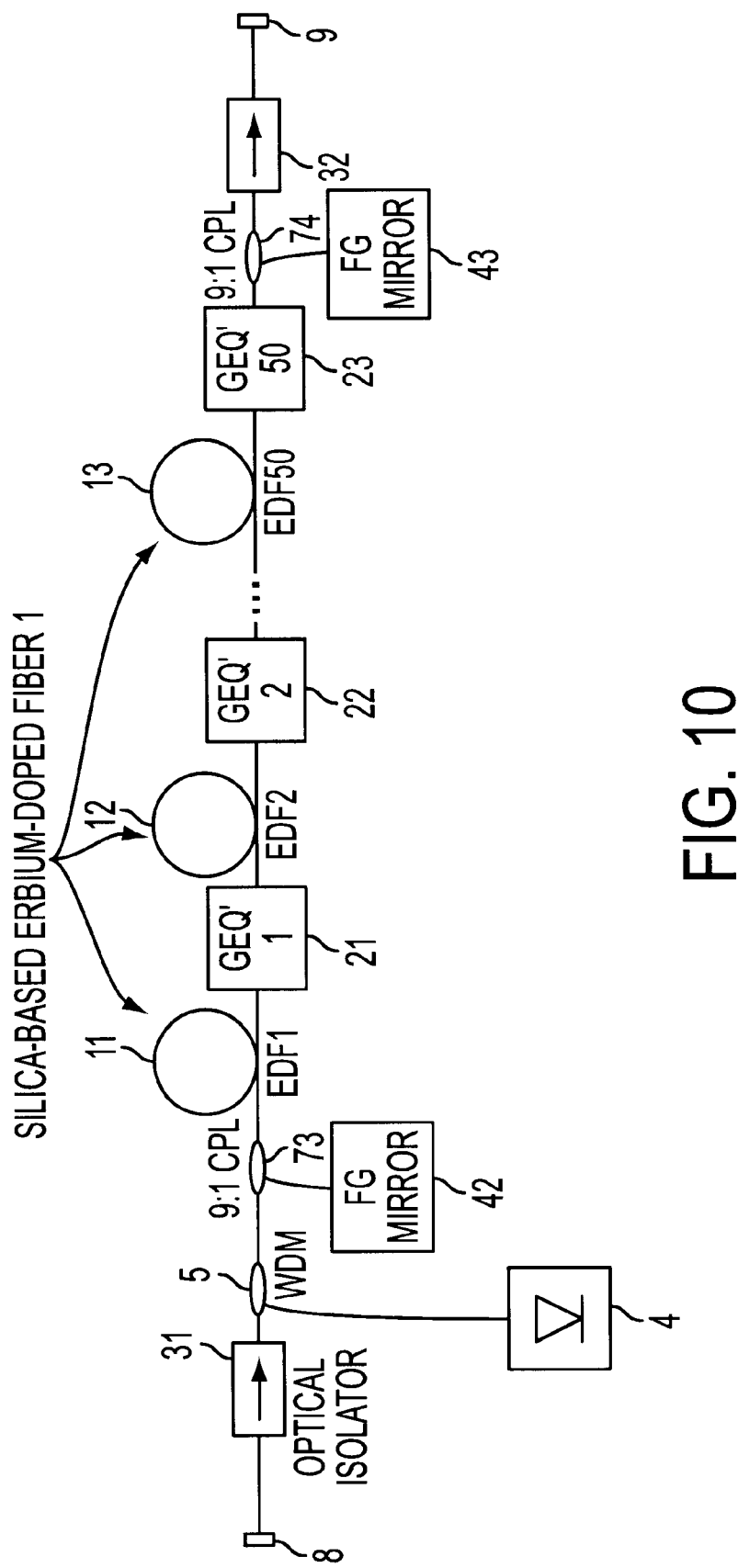
FIG. 10 schematically shows an optical amplifier with two fiber grating reflective mirrors to contain the optical amplification medium within a Fabry-Perot oscillator, according to a fourth preferred embodiment of the present invention.

FIG. 10 schematically shows an optical amplifier with two fiber grating reflective mirrors (FG-mirror) 42, 43 to contain the optical amplification medium within a Fabry-Perot oscillator. Silica-based erbium-doped fibers 11, 72, 23 are used as the optical amplification medium. With the resonator structure formed by the FG mirrors 42, 43, it is not necessary to use an automatic gain control circuit (AGC) controlled via I/O monitors.

In FIG. 10, 9:1 couplers (CPL) 73 and 74 are incorporated into the device of FIG. 6. The fiber grating mirrors 42 and 43 are connected to the device through 10% port of the 9:1 couplers (CLP) 73 and 74. So the effective reflectivity is 1/100 of the reflectivity of FG-mirror. That is, 10% of the light from EDF1 is sent to the fiber grating mirror 42 for reflection. Then, 10% of the reflected light is reintroduced back to the EDF1.

The first 9:1 coupler (CPL) 73 is inserted between the multi-wavelength coupler 5 and the first silica-based erbium-doped fiber 11 (EDF1). The first fiber grating mirror (FG-mirror) 42 is connected to the branched end of the first 9:1 coupler (CPL) 73.

The second 9:1 coupler (CPL) 74 is equipped between the gain equalizer 23 (GEQ' 50) and the optical isolator 32. At the branched end of the second 9:1 coupler (CPL) 74, the second fiber grating mirror (FG-mirror) 43 is provided.

Below will be explained an example of how the above device operates as an S band multi-wavelength optical amplifier.

First of all, preparations are done to ensure that there is no signal light at the lasing wavelength, 1530 nm. The signal light is amplified by the silica-based erbium-doped fiber 11 and receives gain equalization from the multiple gain equalizers 21–23 to achieve the desired S band gain wavelength characteristics such as shown by the white rectangular area in FIG. 3. The signal light is then output. 90% of the light amplified by the silica-based erbium-doped fibers 11–13 is output to the optical isolator 32 by the second 9:1 coupler 74. The remaining 10% of the amplified light is output to the fiber grating mirror (FG-mirror) 43.

The fiber grating mirror (FG-mirror) 43 reflects the 1530 nm light, in a wavelength band of 1530 nm±a few tenths of an nm. The fiber grating mirror 43 returns the reflected light to the silica-based erbium-doped fibers 11–13 through the second 9:1 coupler 74.

The silica-based erbium-doped fibers 11–13 amplify the returned light. Ten percent of the light traveling on the return path is split by the first 9:1 coupler 73 and sent to the first fiber grating mirror (FG-mirror) 42. The fiber grating mirror (FG-mirror) 42 reflects the 1530 nm light (in a wavelength band of 1530 nm±several tenths of an nm), and then returns the reflected light to the silica-based erbium-doped fibers 11–13 via the first 9:1 coupler 73.

The device shown in FIG. 10 forms a 1530 nm Fabry-Perot resonator from the two fiber grating mirrors 42, 43, the two 9:1 couplers (CPL) 73, 74 and the EDFs 21–23 (which together serve as the amplification medium).

The light stimulates the EDFs to form population inversion, which fulfills the lasing conditions at the 1530 nm wavelength, producing an amplified 1530 nm laser output.

When this lasing occurs, the averaged population inversion ratio is fixed at a single value (and the gain is also fixed), and thus, even if the input is changed, the gain and the wavelength characteristics of the gain remain constant.

When the input signal is strong, then a lot of the excitation light power is expended in amplifying the signal light, and the laser operation at 1530 nm stops. When the laser operation stops, the gain stops being uniform. This operation will described in more detail with regard to FIG. 12.

Even though the fiber grating creates a Fabry-Perot resonance lasing at 1530 nm, the fiber grating is not restricted to this wavelength. Resonance can be created with lasing at any wavelength so long as the wavelength (1) causes population inversion in the optical amplification medium, (2) can pass through the gain equalizers, (3) is within the S band, and (4) is not a wavelength used for signal light to be amplified within the resonator. In addition, the resonator structure is not limited to a Fabry-Perot resonator. A ring-shaped resonator can also be used.

Although the device of FIG. 10 has been described with regard to the S band, other bands can be used, if the other bands (1) are within a wavelength range that causes a population inversion in the optical amplification medium, (2) can pass through the gain equalizers, (3) have a lasing wavelength therein, and (4) the lasing wavelength is not used for the signal to be amplified.

If the FIG. 10 gain equalizers are structured to have the wavelength characteristics shown in FIG. 4, light above about 1530 nm is discarded. If the gain equalizer would pass some wavelengths above about 1530 nm (above the signal band), lasing could occur outside of the signal band so long as the fiber grating mirrors 42, 43 created resonance at the lasing wavelength.

Figure 11:
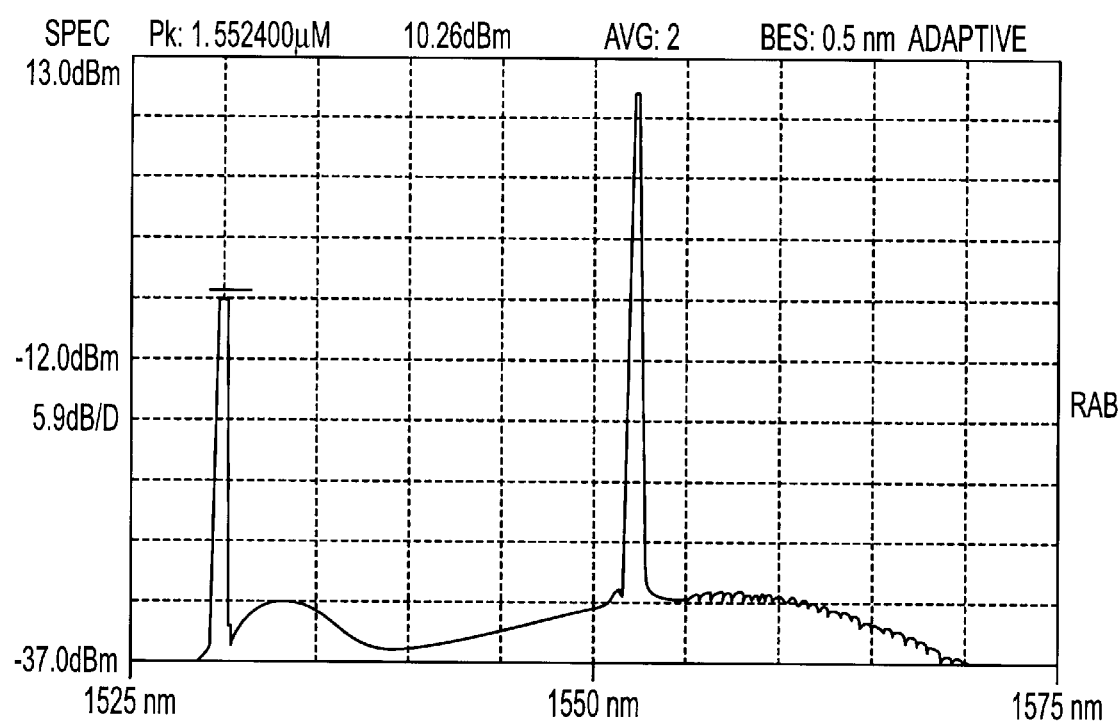
FIG. 11 shows the gain characteristics imparted to 1552 nm C band light by lasing at 1530 nm.
Figure 12:
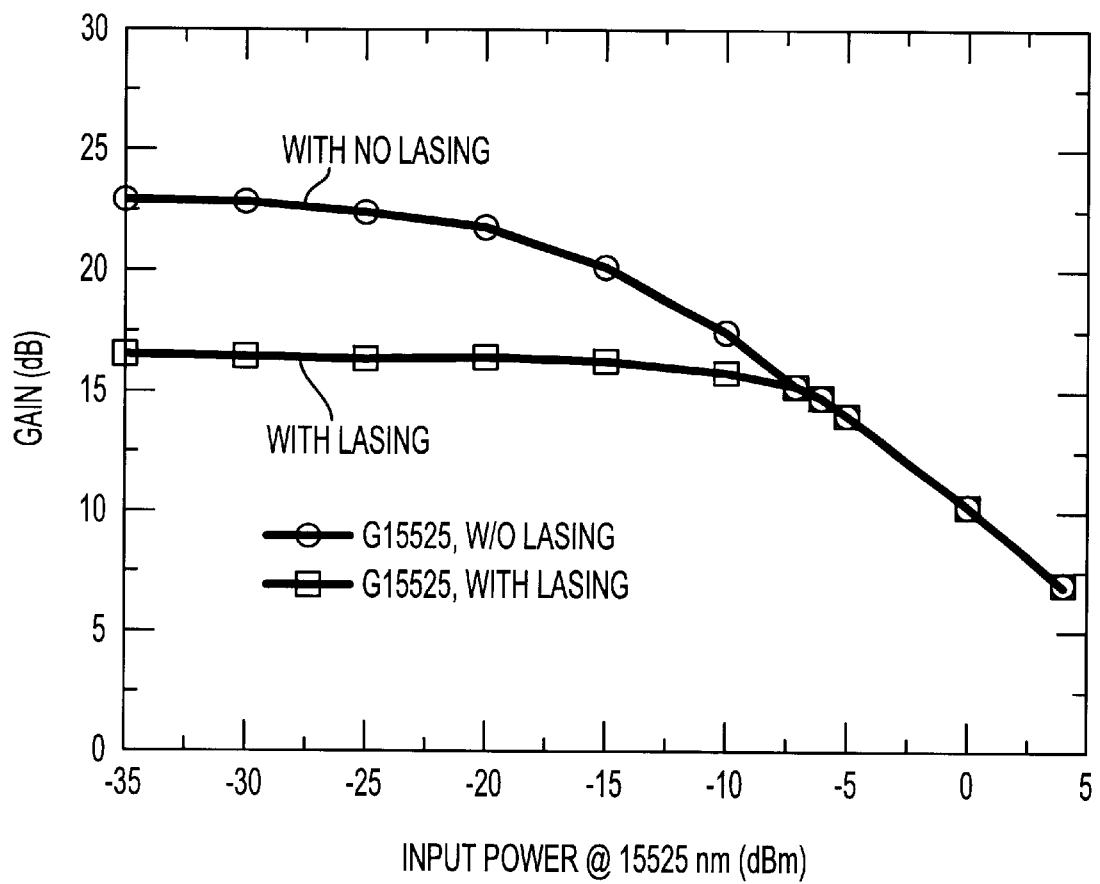
FIG. 12 is a graph showing the differences in gain imparted to 1552 nm C band light for amplification with and without lasing at 1530 nm.

The reasons why the gain of the signal light due to lasing is constant are explained with regard to FIGS. 11 and 12. FIG. 11 shows the gain characteristics imparted to C band light at 1552 nm by lasing at 1530 nm.

In FIG. 10, both ends of the optical amplification medium are equipped with optical couplers, where, at the end of each branch, a fiber grating mirror reflects light at 1530 nm. This forms a resonator and makes it possible to confirm lasing at 1530 nm. Note the peak in FIG. 11 at 1530 nm.

FIG. 12 is a graph showing the differences in gain imparted to C band light at 1552 nm for amplification with and without lasing at 1530 nm. The gains shown in FIG. 12 were obtained from the levels of input and output signal light. As with FIG. 11, the signal light is supplied to the optical amplification medium at 1552 nm. The characteristics marked with the circles in the diagram are those characteristics where there is no resonator and no lasing. As can be seen, the gain changes with the power of the input light.

The characteristics marked with the squares are those characteristics where an oscillator is constructed within the optical amplification media, which oscillator resonates at 1530 nm, causing lasing to occur. As can be seen, with lasing, the gain is substantially constant over a broad input power range from −35 dBm to −10 dBm. That is, fluctuations in input power do not effect the gain. FIG. 12 shows the circumstance where the laser operation is discontinued when the input power level is about −7 dBm or higher.

Figure 13:
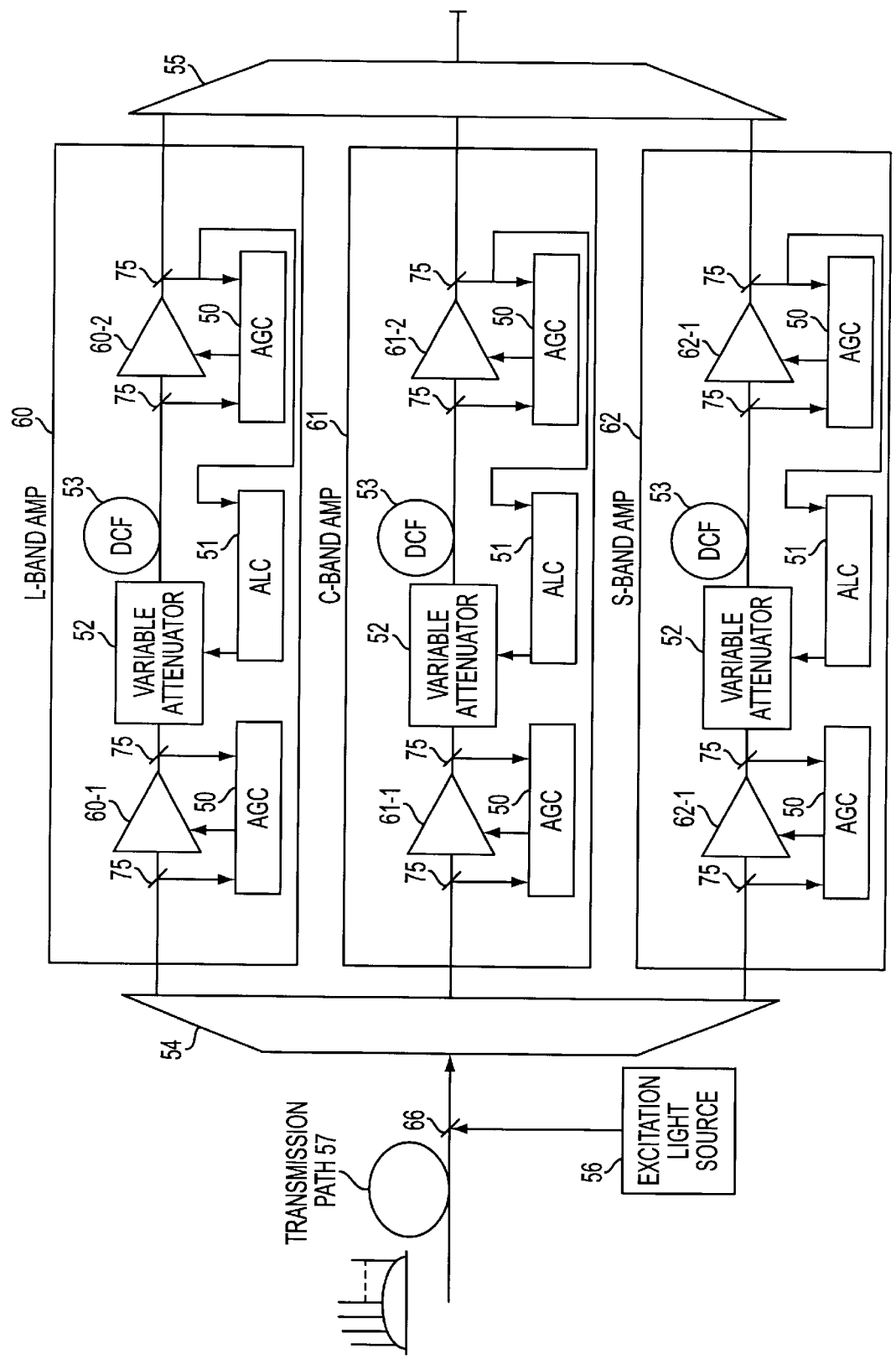
FIG. 13 schematically shows a broad band optical amplifier according to a fifth preferred embodiment of the present invention.

FIG. 13 schematically shows a broad band optical amplifier according to a fifth preferred embodiment of the present invention. Multi-wavelength optical signals come into the amplifier via a transmission path 57 made from an optical fiber. The optical fiber may be a single-mode fiber SMF (with a zero-dispersion wavelength at 1.3 $\mu$m), a dispersion-compensation fiber (a fiber that has a negative dispersion value relative to the SMF), a dispersion-shifted fiber DSF (a fiber with the zero-dispersion wavelength within signal wavelength band), or a non-zero dispersion shifted fiber NZ-DSF (a fiber with the zero-dispersion wavelength provided adjacent to the transmission signal wavelength band).

The transmission path 57 is excited by the excitation light source 56 through a multi-wavelength coupler 66 to perform Raman amplification, which improves the noise figure (NF) when performing distributed amplification on partitioned wavelength bands. In other cases, the Raman amplifier (66 and 56) is not required.

The multi-wavelength optical signals that are amplified by the excitation light source 56 are divided into the various wavelength bands (the L band, the C band, and the S band) by the WDM filter 54.

The light is input into the L band optical amplifier 60, the C band optical amplifier 61, and the S band optical amplifier 62, respectively, and each amplifies signals in the respective light band.

The C band optical amplifier 61 is structured from C band optical amplification units 61-1 and 61-2, splitting couplers 75, a dispersion-compensation fiber 53, a variable attenuator 52, automatic gain control circuits 50, and an automatic level control circuit 51. For the C band optical amplifier units 61-1 and 61-2, the population inversion ratio is controlled to about 0.7 by the automatic gain control circuits 50. Amplification with substantially constant gain between 1530 $\mu$m and 1570 $\mu$m is achieve.

The dispersion-compensation fiber 53 is provided to compensate for dispersion in the transmission path. The variable optical attenuator 52 is controlled by the automatic level control circuit 51 to attenuate the output of the C band optical amplifier unit 61-1 so that the output of the C band optical amplifier 61 is substantially constant.

The L band optical amplifier 60 has L band optical amplification units 60-1 and 60-2, splitting couplers 75, a dispersion-compensation fiber 53, a variable attenuator 52, automatic gain control circuits 50, and an automatic level control circuit 51.

For the L band optical amplifier units 60-1 and 60-2, a low population inversion ratio is maintained by the automatic gain control circuits 50. Even though the gain is suppressed to a constant level, the length of the EDF (which is the amplification medium) is adjusted so that the gain between 1570 nm and 1610 nm is approximately the same as that produced in the C band amplifier 61.

The dispersion-compensation fiber 53 is provided to compensate for dispersion in the transmission path. The variable optical attenuator 52 is controlled by the automatic level control circuit 51 to attenuate the output of the L band optical amplifier unit 60-1 so that the output of the L band optical amplifier 60 is substantially constant.

The S band optical amplifier 62 has S band optical amplification units 62-1 and 62-2, splitting couplers 75, a dispersion-compensation fiber 53, a variable attenuator 52, automatic gain control circuits 50, and an automatic level control circuit 51.

For the S band optical amplifier units 62-1 and 62-2, a high population inversion ratio (around 0.9) is maintained by the automatic gain control circuits 50. Even though the gain is greater than that for the L-Band amplifier, the length of the EDF (which is the amplification medium) is adjusted so that the gain between 1510 nm and 1530 nm is approximately the same as for the C and L band amplifiers 61 and 60.

When it comes to the S band optical amplifier units 62-1 and 62-2, the specific amplifier structures described previously may be used.

The dispersion-compensation fiber 53 is provided to compensate for dispersion in the transmission path. The variable optical attenuator 52 is controlled by the automatic level control circuit 51 to attenuate the output of the S band optical amplifier unit 62-1 so that the output of the S band optical amplifier 62 is substantially constant.

The outputs of the L band optical amplifier 60, the C band optical amplifier 61, and the S band optical amplifier 62 are multiplexed with a WDM (wavelength-division multiplexer) coupler 55, and then output.

Figure 1:
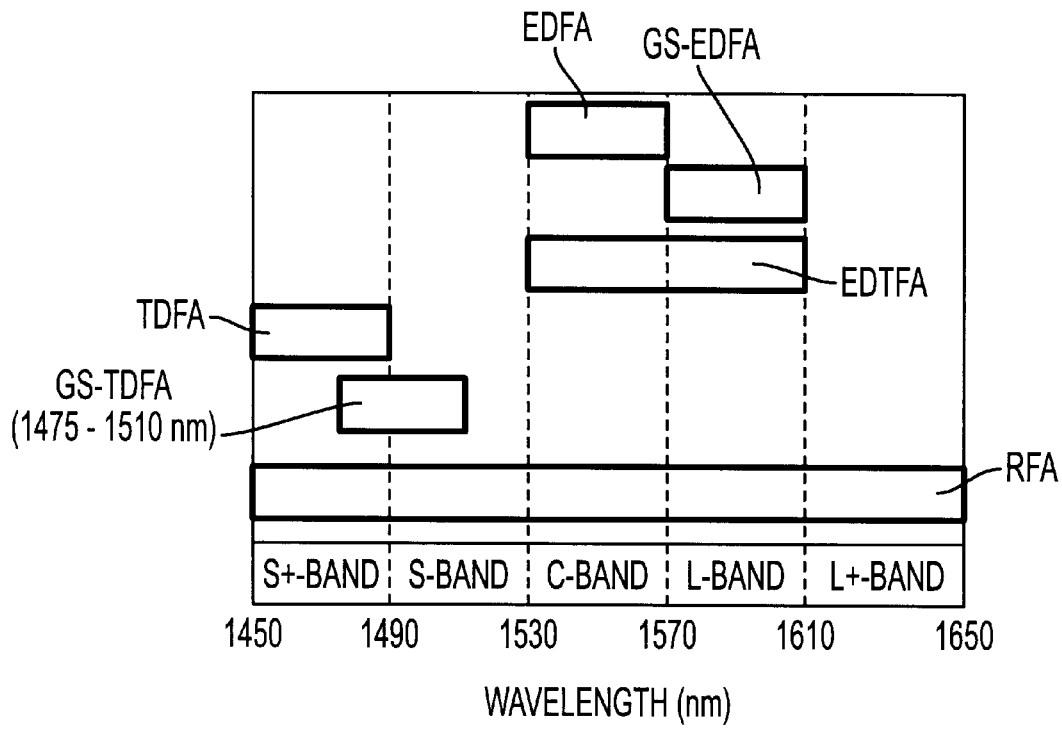
FIG. 1 shows the optical transmission bands and the wavelength ranges for optical fiber amplifiers.

FIG. 13 shows a combination of the S band, the conventional C band, and the L band, but combinations which employ the other wavelength bands described with regard to FIG. 1 are also possible.

The present invention is not limited to the three wavelength bands described above, but can be applied to any combination of two or more wavelength bands. Optical amplifiers that have usable gain in the S band, the S+ band, and the L+ band can be achieved using silica-based erbium-doped fibers (EDF) by (1) increasing the population inversion ratio of the optical amplification medium relative to the L-band optical amplifiers, (2) expanding the band width over which gain is produced by the optical amplification medium, (3) equalizing the gain characteristics over this band width so as to be able to obtain flat gain characteristics at wavelengths outside the peak gain wavelength of the fiber, and (4) selecting the length of the amplification medium to obtain the desired gain value.

Additionally, the conversion efficiency for converting from excited light to signal light can be improved by dividing the optical amplification medium into multiple segments and placing gain equalizers between the segments.

In addition, similar improvements to the conversion efficiency can be obtained by if gratings are used for the gain equalizers, with the gratings formed in the optical wave guide of the optical amplification medium. This allows for the size of the optical amplification medium to be reduced.

One possible benefit of the invention is that it enables the production of optical fiber amplifiers for bands other than just the C band and L band. These new amplifiers could contribute to an increased transmission capacity.

While the invention has been described in connection with the preferred embodiments and examples, it will be understood that modifications within the principles outlined above will be evident to those skilled in the art. Thus, the invention is not limited to the preferred embodiments and examples, but is intended to encompass such modifications.

What is claimed is:

1. An optical amplifier comprising:
   an optical amplification medium;
   an excitation source to stimulate the amplification medium to output at least one wavelength gain peak; and
   a gain equalizer to equalize the output of the amplification medium such that gain is produced at wavelengths other than the wavelength gain peak.

2. An optical amplifier according to claim 1, wherein the gain equalizer attenuates gain at the peak wavelength.

3. An optical amplifier according to claim 1, wherein the gain equalizer equalizes the output of the amplification medium such that nearly even gain is produced at wavelengths shorter than the wavelength gain peak.

4. An optical amplifier according to claim 1, further comprising:
   a variable attenuator, and
   automatic level control circuitry to monitor at least one of the input of the optical amplifier and the output of the optical amplifier and maintain the output level of the optical amplifier at a substantially constant level.

5. An optical amplifier according to claim 1, wherein the optical amplification medium is segmented and comprises a plurality of amplification medium structures which together produce at least one wavelength gain peak when stimulated by the excitation source.

6. An optical amplifier according to claim 5, wherein the amplification medium structures are semiconductor optical amplifiers.

7. An optical amplifier according to claim 5, wherein the gain equalizer comprises a plurality of gain equalizer segments, which together produce gain at wavelengths other than the wavelength gain peak.

8. An optical amplifier according to claim 7, wherein the gain equalizer segments are positioned with amplification medium structures positioned therebetween.

9. An optical amplifier according to claim 7 wherein
   the excitation source stimulates the amplification medium with pumping light having a pumping wavelength, and
   the gain equalizer segments are substantially transparent to the pumping wavelength.

10. An optical amplifier according to claim 1, wherein the optical amplification medium is doped with at least one rare earth element.

11. An optical amplifier according to claim 10, wherein
    the excitation light source stimulates the optical amplification medium to achieve a population inversion ratio having a positive throughout an optical gain signal wavelength band,
    the wavelength gain peak is outside of the optical signal wavelength band, and
    the gain equalizer attenuates the wavelength gain peak.

12. An optical amplifier according to claim 1, wherein the optical amplification medium has an input and an output, the optical amplifier further comprising a feedback loop to the excitation source, to monitor the input and the output of the amplification medium and maintain a substantially constant gain within the amplification medium over time.

13. An optical amplifier according to claim 1, wherein the optical amplification medium has an input and an output, the optical amplifier further comprising:
    monitors located at the input and output of the amplification medium to provide feedback; and
    an automatic gain control circuit connected to the monitors to control the excitation source so as to maintain a substantially constant population inversion ratio within the amplification medium over time.

14. An optical amplifier according to claim 1, further comprising a resonator, the optical amplification medium being located within the resonator.

15. An optical amplifier according to claim 14, wherein
    the optical amplification medium has an input and an output, and the resonator comprises:
- a pair of mirrors that reflect a selected wavelength; and
- optical couplers provided at the input and the output of the amplification medium to divert a portion of the light emitted from the optical amplification medium to the mirrors.

16. An optical amplifier according to claim 15, wherein the optical couplers are 9:1 couplers.

17. An optical amplifier according to claim 15, wherein the mirrors are fiber grating mirrors.

18. An optical amplifier according to claim 15, wherein the gain equalizer is substantially transparent to the selected wavelength.

19. An optical amplifier according to claim 15, wherein
- the selected wavelength reflected by the mirrors is within a signal band used for optical signals to be amplified, and
- no optical signal is transmitted at the selected wavelength.

20. An optical amplifier according to claim 1, wherein the excitation source causes excited emission within the amplification medium.

21. An optical amplifier according to claim 1, wherein the optical amplification medium comprises:
- a cladding;
- a doped core provided interior to the cladding; and
- gratings provided within the highly doped core.

22. An optical amplifier according to claim 21, wherein the core is highly doped.

23. An optical amplifier according to claim 21, wherein the gratings provided within the doped core serve as the gain equalizer.

24. An optical amplifier according to claim 21, wherein the gratings are long-period gratings.

25. An optical amplifier device, comprising:
- an amplification medium comprising at least one erbium doped fiber;
- an excitation light source to produce a population inversion ratio of about 0.7 to about 1.0 within the amplification medium; and
- a gain equalizer to obtain substantially identical wavelength characteristics for a wavelength band of from about 1490 nm to about 1530 nm.

26. An optical amplifier device, comprising:
- an amplification medium comprising at least one erbium doped fiber;
- an excitation light source to produce a population inversion ratio of about 0.8 to about 1.0 within the amplification medium; and
- a gain equalizer to obtain substantially identical wavelength characteristics for a wavelength band of from about 1450 nm to about 1490 nm.

27. An optical amplifier device, comprising:
- an amplification medium comprising at least one erbium doped fiber;
- an excitation light source to produce a population inversion ratio of about 0.3 to about 1.0 within the amplification medium; and
- a gain equalizer to obtain substantially identical wavelength characteristics for a wavelength band of from about 1610 nm to about 1650 nm.

28. An optical amplification method, comprising:
- selecting a population inversion ratio to achieve positive gain throughout an optical signal wavelength band;
- exciting the amplification medium to the selected population inversion ratio to produce a wavelength gain peak at a wavelength outside of the optical signal wavelength band;
- equalizing the gain to achieve substantially uniform gain over the optical signal wavelength band; and
- attenuating amplification in wavelength bands outside of the optical signal wavelength band.

29. An optical amplification method according to claim 28, wherein the optical signal wavelength band is at wavelengths less than the wavelength of the wavelength gain peak for the amplification medium.

30. An optical amplifier comprising:
- a WDM splitter to separate first and second different optical signal wavelength bands;
- an optical amplification device for the first wavelength optical signal band, comprising:
  - a first amplification medium;
  - an excitation light source to produce a first population inversion ratio within the first amplification medium; and
  - a gain equalizer to obtain substantially uniform gain over the first optical signal wavelength band;
- an optical amplification device for the second wavelength band, comprising:
  - a second amplification medium; and
  - an excitation light source to produce a second population inversion ratio within the second amplification medium, the first and second population inversion ratios being different; and
- a WDM coupler to recombine the first and second optical wavelength bands after amplification.

31. An optical amplifier according to claim 30, wherein the first population inversion ratio is less than the second population inversion ratio.

32. An optical amplifier according to claim 31, wherein
- the first and second optical amplification mediums each comprise at least one rare earth element doped optical fiber, and
- the length of the at least one rare earth element doped optical fiber for the first amplification medium is greater than that for the second amplification medium.

33. An optical amplifier according to claim 30, wherein
- the first amplification medium has a wavelength gain peak, and
- the wavelength gain peak is outside of the first optical signal wavelength band.

34. An optical amplifier according to claim 30, wherein the WDM splitter separates first, second and third different optical signal wavelength bands, the optical amplifier further comprising an optical amplification device for the third wavelength band.

35. An optical amplifier comprising:
- an optical amplification medium;
- an excitation source to stimulate the amplification medium to output amplified light having at least one wavelength gain peak; and
- a gain equalizer to equalize the amplified light such that gain is produced at wavelengths other than the wavelength gain peak.

36. An optical amplifier according to claim 1, wherein the gain equalizer produces a flat gain profile without the gain peak, such that the flat gain profile is wider than a gain band of the amplification medium.

* * * * *